May 18, 1943.　　　A. A. HIRST　　　2,319,457
APPARATUS FOR GRAVITY SEPARATION OF GRANULAR MATERIAL
Filed May 31, 1940　　　3 Sheets-Sheet 1
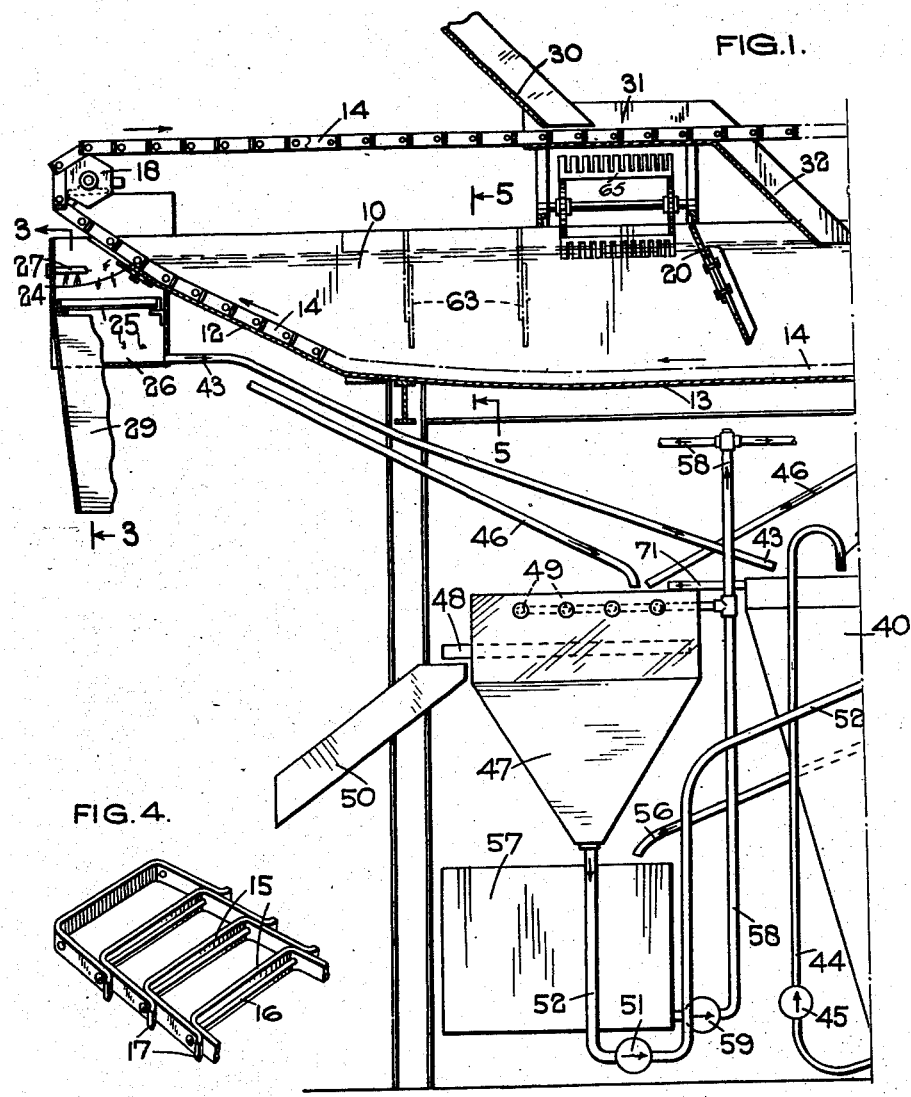
Inventor
ARTHUR A HIRST
by
Attorneys

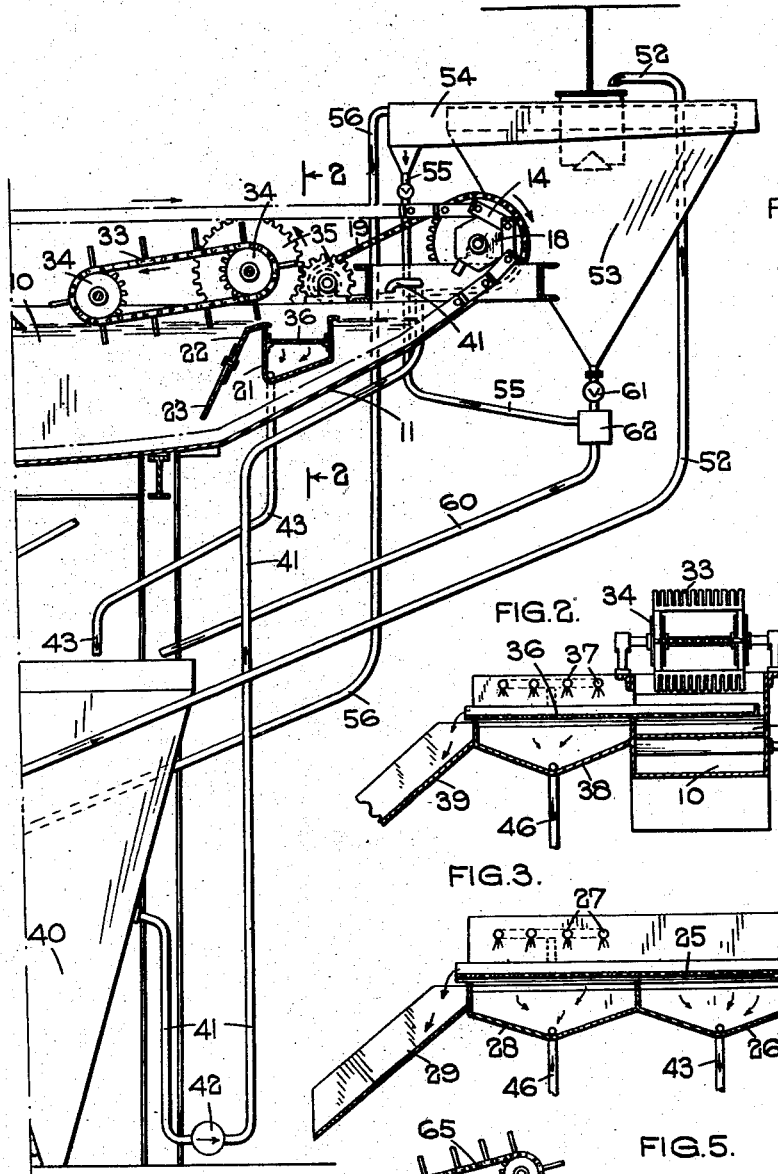

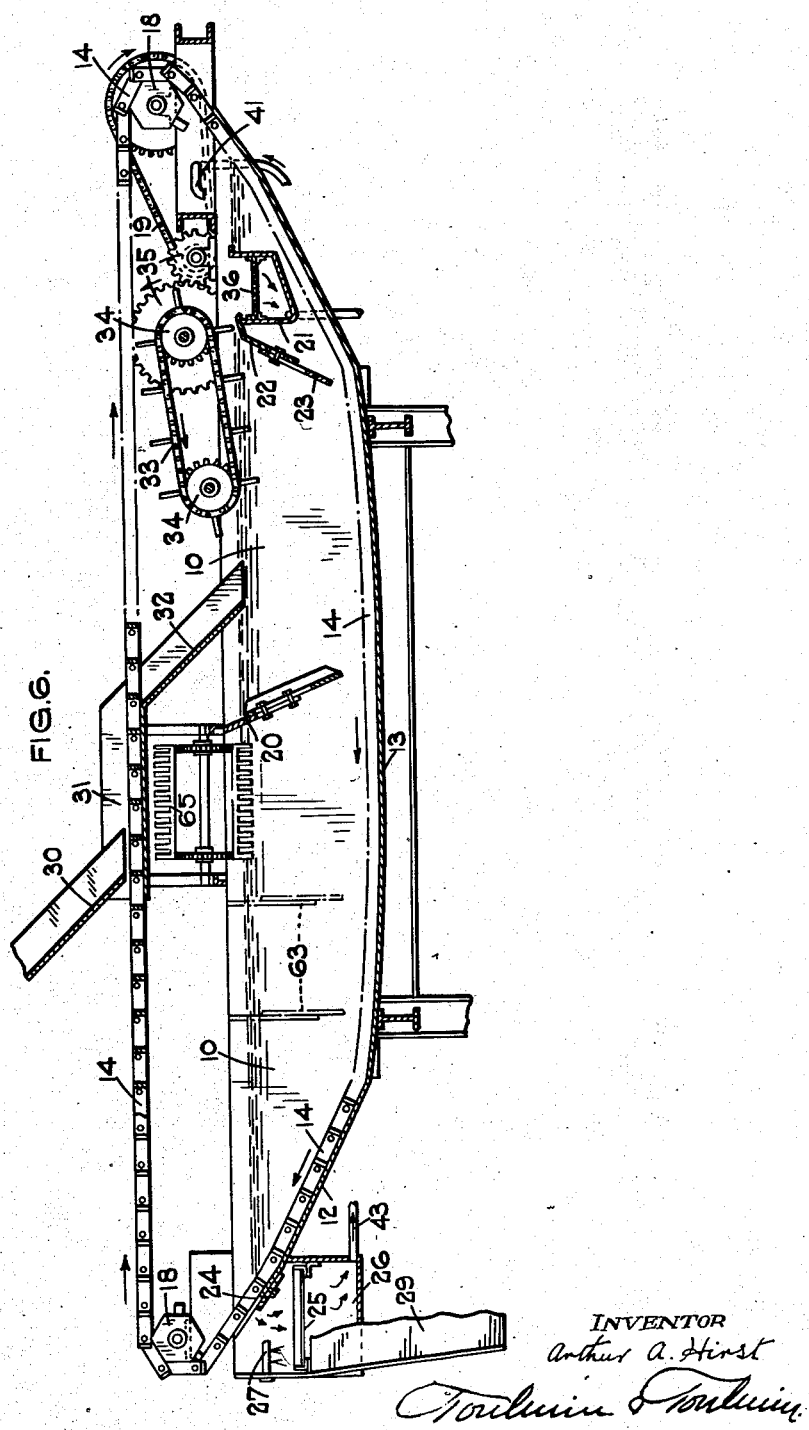

Patented May 18, 1943

2,319,457

UNITED STATES PATENT OFFICE 2,319,457

APPARATUS FOR GRAVITY SEPARATION OF GRANULAR MATERIAL

Arthur Algernon Hirst, Northfield, Birmingham, England, assignor of one-half to Simon-Carves Limited, Cheadle Heath, Stockport, England Application May 31, 1940, Serial No. 338,131
In Great Britain June 1, 1939

10 Claims. (Cl. 209—173)

This invention relates to apparatus for gravity separation of granular material such as coal or ores and of the type in which the material to be separated is fed into a vessel containing a separating fluid and density of which is intermediate the densities of the materials or the main constituents to be separated.

The invention is particularly suited to the use of a separating fluid consisting of a suspension of finely comminuted solids in water or other fluid.

One object of the present invention is to improve and facilitate the separation and the independent collection of the various products or constituents of the material to be treated.

A further object of the invention is the attainment of an improved control and adjustment of the range or scope of the separation in the different zones or stages, so that variation can readily be made to suit different materials or constituents.

A still further object resides in an improved independent separation of products or particles of approximately the same specific gravity as the suspension so as to avoid separation of such products or particles with one or more of the other separated products.

Referring to the drawings:

Figure 1 is an elevation of one form of apparatus according to this invention.

Figure 2 is a section on line 2—2 of Figure 1.

Figure 3 is a section on line 3—3 of Figure 1.

Figure 4 is a perspective view of a detail.

Figure 5 is a section of a slightly modified construction.

Figure 6 is a sectional view in side elevation of the separating compartment.

In the construction illustrated the apparatus includes an elongated trough or vessel 10 which is relatively shallow, the base of the trough being inclined at the two ends, namely, the inlet end as indicated at 11 and the outlet end as indicated at 12 in Figure 1, whilst at the centre of the length of the trough and intermediate these ends the base 13 is slightly curved and may if desired be flat and horizontal.

Extending through the trough in the direction of the length thereof is an endless scraper 14 comprising scraping blades 15 of substantially U shape pivoted together on link pins 16 as indicated in Figure 4, the ends of the sides of the U shaped blades being out-turned at 17 to scrape the sides of the trough and prevent deposits or accumulations such as might tend to impede the operation of the scraper.

This scraper is mounted on carrying members 18 rotatably supported at the two ends of the trough, the member 18 at the inlet end of the trough being driven by a drive 19 from the drive means for the apparatus. The lower run of the chain moves over the base of the trough for the complete length of the latter, the direction of movement being such that the chain passes down the inlet end 11 and up the outlet end 12 of the base.

A transverse partition 20 is mounted in the trough intermediate the ends thereof, this partition extending completely cross the width of the trough for a depth less than that of the trough at the position of the partition. This partition comprises two plates placed one upon the other to overlap and secured together in a manner permitting variation of the extent of overlapping so that the effective depth of the partition in the trough can be adjusted.

The partition 20 which extends transversely of the direction of flow through the trough divides the vessel into two main compartments, namely, an inlet compartment into which is fed the material to be treated and an outlet compartment.

At the inlet end of the trough there is a transverse channel 21 extending across the width of the trough and provided with an inclined baffle 22, which also includes a lower portion 23 adjustable upon the upper portion so that the effective depth of the baffle in the trough can be regulated as described in the case of the partition 20.

Circulating through the trough is a separating medium comprising a suspension of sand in water or other fluid, the density of the suspension being maintained substantially constant as will hereinafter be described.

At the outlet end 12 of the trough there is an adjustable plate 24 mounted for movement over the end of the inclined portion 12 of the base enabling variation of the effective height of the outlet over which is discharged the material removed by the scraper 14.

Such material removed by the scraper falls upon a perforated screen or jigger 25 shown in Figure 3 and upon the first portion of this screen the material is drained of suspension which is collected in a cone 26, whilst on a further portion the material is sprayed or washed by discharge of liquid from sprays 27, such spray liquid being collected in a cone 28 whilst the washed material is discharged down a chute 29.

Above the trough is a chute 30 down which is discharged the material to be treated in the apparatus, this material falling into a horizontal channel 31 along which passes the upper run of the scraper 14 which thus operates to move the material along the channel 31 to a further inclined chute 32 leading down into the trough in advance of the partition 20.

In advance of the chute 32 is a comb conveyor 33 mounted on sprockets 34 and driven through gearing 35 from the drive means for the apparatus, the rotation of this conveyor being such that the lower run, which dips into the liquid in the trough, tends to engage the product floating in the suspension and to move this product over the baffle 22 and into the channel 21.

This material falls on a perforated screen or jigger 36 shown in Figure 2 and is drained of suspension whilst on the portion of the jigger extending in the transverse channel 21, whilst on a further portion of the jigger the material is washed by discharge from the sprays 37, the spray liquid being collected in a cone 38 whilst the washed material is discharged down a chute 39.

For maintaining substantially constant the density of the suspension in the trough 10 this suspension is circulated between the trough and a reserve tank 40 shown in Figure 1, the suspension being pumped from the tank through a pipe 41 in which is a pump 42 and which discharges into the inlet end of the trough.

The suspension removed from the trough by the operation of the scrapers 14 and 33 is drained from the separated products as above described and this suspension is conveyed back to the reserve tank from the collecting cone 26 and the channel 21 by means of pipes 43.

Intimate mixing of the suspension in the reserve tank 40 is ensured by circulating the suspension within the tank by a circulation pipe 44 in which is a pump 45 and which withdraws suspension from the base of the reserve tank and discharges such suspension into the top of the tank.

The underflow from the collecting cones 28 and 38 namely, the spray medium collected after spraying the separated products, is conveyed by pipes 46 to a dilute suspension tank 47 in the top of which is a fine mesh screen or jigger 48 for separating the liquid from the slurry washed from the separated products by the sprays, such slurry being again sprayed on this screen 48 from sprays 49 and being then discharged down a chute 50.

The underflow from the dilute suspension tank is forced by a pump 51 through a pipe 52 to a settling tank 53 having an overflow rim 54 from which clear suspension is passed back to the reserve tank through a pipe 55, via a density control device 62, whilst an overflow pipe 56 leads from the top of this rim down to a spray medium tank 57 feeding the sprays 27, 37 and 48 through a pipe 58 provided with a pump 59.

The base of the settling tank 53 is connected by a pipe 60 to the reserve tank 40 and in this pipe 60 is a valve 61 and the density control device 62.

In operation the material to be treated, for example, the coal to be washed or cleaned, is fed down the chute 30 and is moved by the scraper 14 to the chute 32, being discharged thereby into the trough on the inlet side of the partition 20.

For separating coal particles from dirt or foreign matter the specific gravity of the separating fluid may be regulated at a figure of about 1.35, i. e. at a density equal to that at which clean coal flows through the body of the separating fluid to collect at the top of this fluid whilst the dirt or middlings sink in, or remain suspended in, the fluid.

The clean coal flowing in the fluid is moved by the comb conveyor 33 over the partition 22 and on to the screen 36 where the coal is first drained of suspension and is then sprayed prior to being discharged down the clean coal chute 39.

Of the separating fluid fed into the inlet compartment, part overflows the partition or weir 22 with the clean coal and part flows under the partition 20 into the outlet compartment to overflow at the weir or plate 24.

The main separation of light and heavy particles takes place in the inlet compartment, the light particles collecting at or near the surface of the fluid whence they are removed by the conveyor 33 as above described, whereas the heavy particles sink to the bottom of the trough and are carried by the scraper 14 into the outlet compartment.

The particles of approximately the same specific gravity as the separating fluid tend to be swept into the outlet compartment by the current under the partition dividing the inlet and outlet compartments. The present invention provides means for regulating the separation of particles of approximately the same specific gravity as the suspension by controlling the flow of fluid beneath the partition. The flow of fluid beneath the partition is regulated by adjustment of this partition so that the depth of flow beneath the partition is varied and/or by adjustment of the relative heights or levels of the overflows or weirs of the inlet and outlet compartments.

If the light material separated in the inlet compartment is required to be exceedingly pure, that is exceptionally free from material denser than the separating fluid, it may become necessary to adjust the underflow beneath the partition so that some particles slightly less dense than the fluid are swept into the outlet compartment.

In the outlet compartment particles lighter than the separating fluid will rise to or near the surface of the fluid.

A further feature of the invention relates to the provision of means for collecting in one or more stages the particles collecting at or near the surface or remaining in suspension in the outlet compartment and separating such particles from those sinking to the bottom of the compartment.

In one form of apparatus, in addition to the partition 20 between the inlet and outlet compartments, one or more further partitions 63 as indicated in dotted lines in Figure 1 divide the outlet compartment into subsidiary compartments. Each partition 63 may be adjustable as described in the case of the partition 20 and each subsidiary outlet compartment is provided with an overflow or weir 64 as shown in Figure 5 and which is preferably adjustable. These subsidiary outlet compartments form one or more relatively quiescent zones in which particles lighter than or approximately the same specific gravity as the separating fluid are separated and collected.

Such material tends to rise in the relatively quiescent zone or zones and is removed by a conveyor 65, similar to the conveyor 33, being discharged over the weir 64 on to a screen or jigger 66 where it is first drained and then washed by sprays 67 prior to being discharged down the chute 68.

The suspension removed with and drained from the material is collected in a cone 69 and returned by a pipe 43 to the reserve tank 40, whilst the spray liquid is collected in a cone 70 and returned to the tank 47 by a pipe 46.

Such devices may be provided for each of the subsidiary outlet compartments to enable collection and removal of material separating in any of the compartments including a partition 63.

The material sinking to the bottom of the trough is carried by the scraper 14 along the base of the trough and over the outlet or weir plate 24 on to the screen 25 on which it is drained and sprayed and from which it is discharged down the chute 29.

The partitions 63 may if desired be perforated.

The overflow or weirs for the various products may be arranged for adjustment to enable variation of the liquid level in the vessel and to control both the flow in the trough and the amount of separating fluid and the various grades of products or particles evacuated at such overflows or weirs. Adjustment of the relative heights of the overflows or weirs can also be used to control the underflow from the inlet to the outlet compartments beneath the partitions.

In the arrangement illustrated the overflow or weir 22 in the inlet compartment is arranged at a fixed height although provided with an adjustable lower portion 23 whilst the height of the outlet weir 24 and if necessary the additional weir or weirs 64 are arranged for height adjustments since this latter can quite readily be effected. If desired, however, the arrangement may be reversed and the height of the weir 22 may be adjustable to effect the control of adjustment above mentioned.

The density of the suspension is maintained substantially constant in the main trough by circulating this suspension through the reserve tank 40 provided with any known means for controlling the density of the suspension automatically so as to prevent irregularities in the separation within the main trough.

The operation of the density control device 62 is to mix clarified overflow and thickened underflow from the settling tank in the required proportions, this mixture being returned to the reserve tank by the pipe 60, the mixture in the reserve tank being maintained substantially homogeneous by circulation through the pipe 44 and pump 45.

An overflow 71 from the reserve tank provides for the return of excess suspension to the tank 47 and thence to the settling tank 53.

The movement of the mechanical scraper up the inclined base of the tank at the outlet end thereof causes a slight variation in the liquid level in the whole apparatus and this helps with the overflow of the light particles and with the separation of the particles in the inlet compartment.

When the apparatus is used for separating coal from dirt or middlings, the provision of means for the separate collection of particles of a density equal to or approximately equal to that of the separating medium, enables such particles to be mixed either with the clean coal or with the dirt or refuse, as desired, or alternatively such particles may be collected as a separate product which may, for example, be used for boiler firing, as for example at the colliery where the separation apparatus is installed.

What I claim then is:

1. Means for the gravity separation of granular material and of the kind specified, including a relatively shallow vessel, a separating medium of a specific gravity intermediate that of the lightest and heaviest materials to be separated, a transverse partition extending across said vessel but having its lower edge spaced from the bottom of the latter, such partition dividing the vessel into two communicating compartments, namely, an inlet compartment, in which the granular material is subjected to one separation treatment, and an outlet compartment, means for removing particles floating in the said separating medium in the inlet compartment, means for producing a flow of separating medium from said inlet compartment to said outlet compartment to transfer material from the inlet compartment to the outlet compartment here such material is subjected to a further separation treatment, said flow being adapted to sweep from the inlet compartment to the outlet compartment particles of approximately the same density as that of the separating medium, means for regulating the strength of said flow, mechanical scraping means for removing from the bottom of the said vessel material sinking in the separating medium, and means for removing particles from the surface level of the separating medium in the outlet compartment separately of the material removed by said mechanical scraping means.

2. Means for the gravity separation of granular material and of the kind specified, including a relatively shallow vessel, a separating medium of a specific gravity intermediate that of the lightest and heaviest materials to be separated, a partition projecting downwardly in said vessel and dividing it into an inlet compartment in which the granular material is subjected to one separation treatment, and an outlet compartment in which material transferred from the inlet compartment is subjected to a further separation treatment, said partition being spaced from the bottom of said vessel to provide a passage for a flow from said inlet compartment to said outlet compartment, means for supplying the said separating medium to said inlet compartment, means for directing into said inlet compartment the material to be treated, means for producing a flow from said inlet compartment to said outlet compartment under said partition, said flow being adapted to sweep from the inlet compartment to the outlet compartment particles of approximately the same density as that of the separating medium, means for regulating the strength of said flow, outlet means for the removal of particles floating in the medium in said inlet compartment, mechanical scraping means for removing from said vessel material sinking in the separating medium, and means for removing particles from the surface levels of the separating medium in the outlet compartment separately of the material removed by said mechanical scraping means.

3. Means for the gravity separation of granular material and of the kind specified, including a relatively shallow vessel, a separating medium of a specific gravity intermediate that of the lightest and heaviest materials to be separated, a partition projecting downwardly in said vessel and dividing said vessel into an inlet compartment and an outlet compartment, said partition being spaced from the bottom of said vessel to provide a passage for a flow from said inlet compartment to said outlet compartment, means for supplying the said separating medium to said inlet compartment, means for directing into said inlet compartment intermediate the ends of the vessel, the material to be treated, means for producing a flow from said inlet compartment into said outlet compartment under said partition, means for regulating the strength of said flow, means for removing from one end of the vessel the particles floating in the medium in the inlet compartment, an overflow in said outlet compartment and at the other end of said vessel, and an endless link scraper moving over the base of the vessel for moving from the inlet compartment to the outlet compartment, particles sinking in the separating medium, and for discharging said sinking particles together with separating medium over said overflow in the outlet compartment.

4. Means according to claim 2, including means for feeding the separating medium into the inlet compartment at the inlet end, means for introducing into the inlet compartment near said partition the material to be separated, and scraping means for removing from the inlet compartment near the inlet end material floating in the inlet compartment.

5. Means for the gravity separation of granular material and of the kind specified, including a relatively shallow vessel, a separating medium of a specific gravity intermediate that of the lightest and heaviest materials to be separated, a transverse partition projecting downwardly in said vessel at an acute angle to the vertical and dividing said vessel into an inlet compartment in which the granular material is subjected to one separation treatment, and an outlet compartment in which material transferred from the inlet compartment is subjected to a further separation treatment, said partition being spaced from the bottom of said vessel to provide a passage for a flow from said inlet compartment to said outlet compartment, means for producing a flow from the bottom of said inlet compartment into said outlet compartment under said partition, said flow being adapted to sweep from the inlet compartment to the outlet compartment particles of approximately the same density as that of the separating medium, said partition having its lower portion adjustable relative to its upper portion for varying the effective depth of the partition within the vessel to regulate the strength of said flow under said partition, means for supplying the said separating medium to said inlet compartment, means for directing into said inlet compartment the material to be treated, outlet means for the removal of particles floating in the medium in said inlet compartment, mechanical scraping means for removing from said vessel material sinking in the separating medium, and means for removing particles from the surface levels of the separating medium in the outlet compartment separately of the material removed by said mechanical scraping means.

6. Means for the gravity separation of granular material and of the kind specified, including a relatively shallow vessel, a separating medium of a specific gravity intermediate that of the lightest and heaviest materials to be separated, a transverse partition projecting downwardly in said vessel at an acute angle to the vertical and dividing said vessel into an inlet compartment in which is effected the main separation treatment, and an outlet compartment in which there is a body of said separating medium in which material transferred from the inlet compartment is subjected to a further separation treatment, said partition being spaced from the bottom of said vessel to provide a passage for a flow from said inlet compartment to said outlet compartment, means for producing a flow from said inlet compartment to said outlet compartment under said partition, said flow being adapted to sweep from the inlet compartment to the outlet compartment particles of approximately the same density as that of the separating medium, means for varying the effective depth of the partition within the vessel to regulate the strength of said flow, means for supplying the said separating medium to said inlet compartment, means for directing into said inlet compartment the material to be treated, overflow means in said inlet compartment for the removal of particles floating in the medium together with part of the separating medium, outlet means in said outlet compartment, mechanical scraping means for removing through said outlet means material sinking to the bottom of the separating medium, and means for removing separately of such sinking material, the particles floating in the separating medium in the outlet compartment.

7. Means for the gravity separation of granular material and of the kind specified, including a relatively shallow vessel, a separating medium of a specific gravity intermediate that of the lightest and heaviest materials to be separated, a transverse partition projecting downwardly in said vessel at an acute angle to the vertical and dividing said vessel into an inlet compartment in which the granular material is subjected to one separation treatment, and an outlet compartment in which material transferred from the inlet compartment is subjected to a further separation treatment, said partition being spaced from the bottom of said vessel to provide a passage for a flow from said inlet compartment to said outlet compartment, means for producing a flow from said inlet compartment to said outlet compartment under said partition, said flow being adapted to sweep from the inlet compartment to the outlet compartment particles of approximately the same density as that of the separating medium, a lower portion adjustably secured on said partition, said lower portion being adjustable relative to said partition for varying the effective depth of the partition within the vessel to regulate the strength of said flow under said partition, means for supplying the said separating medium to said inlet compartment, means for directing into said inlet compartment the material to be treated, overflow means in said inlet compartment for the removal of particles floating in the said medium together with part of the separating medium, outlet means in said outlet compartment, mechanical scraping means for removing through said outlet means material sinking in the separating medium, and means for removing separately of such sinking material, the particles floating in the separating medium in the outlet compartment.

8. Means for the gravity separation of granular material and of the kind specified, including a relatively shallow elongated trough, a base to said trough, an upwardly sloping portion at each end of said base, a substantially flat central portion to said base, a separating medium of a specific gravity intermediate that of the lightest and heaviest materials to be separated, a transverse partition intermediate the ends of said trough, said partition projecting downwardly in said vessel and dividing said trough into an inlet compartment in which is effected the main separation treatment, and an outlet compartment in which there is a body of the said separating medium in which material transferred from the inlet compartment is subjected to a further separation treatment, said partition being spaced from the bottom of said vessel to provide a passage for a flow from said inlet compartment to said outlet compartment, means for producing a flow from said inlet compartment to said outlet compartment under said partition, said flow being adapted to sweep from the inlet compartment to the outlet compartment particles of approximately the same density as that of the separating medium, means for regulating the strength of said flow, means for supplying the said separating medium to said inlet compartment, means for directing into said inlet compartment the material to be treated, overflow means in said inlet compartment for the removal of particles floating in the separating medium together with part of such medium, outlet means in said outlet compartment, mechanical endless scraper means for removing through said outlet means material sinking in the separating medium, such scraper means comprising a series of U-shaped scraper blades, having outturned ends, connected by link pins, and means for removing separately of such sinking material, the particles floating in the separating medium in the outlet compartment.

9. Means for the gravity separation of granular material and of the kind specified, including a relatively shallow vessel, a separating medium of a specific gravity intermediate that of the lightest and heaviest materials to be separated, an inlet compartment in which is effected the main separation treatment, an outlet compartment in which there is a body of separating medium in which material transferred from the inlet compartment is subjected to a further separation treatment, a partition extending across and downwardly in said vessel and dividing the inlet compartment from the outlet compartment except at the lower part of the vessel, means for producing a flow from said inlet compartment to said outlet compartment, means for regulating the strength of said flow, said flow being adapted to sweep from the inlet compartment to the outlet compartment particles of approximately the same density as that of the separating medium, means for supplying separating medium to said inlet compartment, means for directing into said inlet compartment the material to be treated, an overflow for said inlet compartment, means for removing through said overflow the material floating in the medium in said inlet compartment, an overflow for said outlet compartment disposed at the opposite end of said vessel to the overflow for the said inlet compartment, means for removing through said last mentioned overflow the material floating in the medium in said outlet compartment, outlet means in said outlet compartment, and mechanical scraping means for removing through said outlet means the material sinking in the separating medium, said scraping means being operative to remove said sinking material separately of the material floating in the medium in said outlet compartment.

10. Means for the gravity sepaartion of granular material and of the kind specified, including a relatively shallow elongated trough, a base to said trough, an upwardly sloping portion at each end of said base, a substantially flat central portion to said base, a separating medium of a specific gravity intermediate that of the lightest and heaviest materials to be separated, a transverse partition intermediate the ends of said trough, said partition projecting downwardly in said vessel and dividing said trough into an inlet compartment in which is effected the main separation treatment, and an outlet compartment in which there is a body of the said separating medium in which material transferred from the inlet compartment is subjected to a further separation treatment, the lower edge of the said partition being spaced from the bottom of said vessel to provide a passage for a flow from said inlet compartment to said outlet compartment, means for producing a flow from the bottom of said inlet compartment into said outlet compartment under said partition, said flow being adapted to sweep from the inlet compartment to the outlet compartment particles of approximately the same density as that of the separating medium, means for varying the effective depth of the partition within the vessel to regulate the strength of said flow under said partition, overflow means in said inlet compartment for the removal of particles floating in the separating medium in said inlet compartment, a further downwardly directed partition extending transversely across said outlet compartment to divide said compartment into subsidiary compartments, each subsidiary compartment forming a zone for the separation of particles of approximately the same specific gravity as the separating medium, overflow means in said outlet compartment for each of said subsidiary compartments, mechanical means for removing separated material floating in the separating medium in said subsidiary compartments, and means for removing separately the material sinking in the separating medium.

ARTHUR A. HIRST.